United States Patent
Trapp et al.

(12)

(10) Patent No.: US 6,579,010 B2
(45) Date of Patent: Jun. 17, 2003

(54) RETAINER NUT

(75) Inventors: Michael Kelly Trapp, Mason, OH (US); Michael John Halligan, Mason, OH (US); Thomas De Witt Woodrow, Fountainebleau (FR); Giridhar Namala, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/945,206

(22) Filed: Aug. 31, 2001

(65) Prior Publication Data

US 2003/0044097 A1 Mar. 6, 2003

(51) Int. Cl.[7] ............................................. F16C 43/00
(52) U.S. Cl. ...................................... 384/540; 384/537
(58) Field of Search ............................ 384/540 O, 485, 384/537, 589, 906, 571, 520

(56) References Cited

U.S. PATENT DOCUMENTS

| | | | | |
|---|---|---|---|---|
| 3,799,635 A | * | 3/1974 | Worrix | 384/420 |
| 3,915,523 A | * | 10/1975 | Shank | 384/540 |
| 4,046,223 A | | 9/1977 | McHugh | |
| 4,966,474 A | * | 10/1990 | Geiger | 384/517 |
| 5,411,337 A | * | 5/1995 | Bianco et al. | 384/537 |
| 5,443,316 A | * | 8/1995 | Deane et al. | 384/485 |
| 5,610,341 A | | 3/1997 | Tortora | |
| 5,809,838 A | * | 9/1998 | Miyaguchi et al. | 74/89.44 |
| 5,813,214 A | | 9/1998 | Moniz et al. | |
| 5,971,706 A | | 10/1999 | Glista et al. | |
| 5,988,341 A | * | 11/1999 | Allen et al. | 384/537 |
| 6,247,556 B1 | * | 6/2001 | Chen | 184/83 |
| 6,406,188 B1 | * | 6/2002 | Lin et al. | 384/504 |
| 6,412,985 B1 | * | 7/2002 | Schweitzer et al. | 384/537 |

* cited by examiner

Primary Examiner—Christopher P. Schwartz
Assistant Examiner—Melanie Torres
(74) Attorney, Agent, or Firm—Nathan D. Herkamp; Pierce Atwood

(57) ABSTRACT

A retainer nut for use in a bearing assembly disposed between a shaft and another structural element does not trap metallic chips from a failing bearing. The bearing assembly includes a first race mounted to the shaft, a second race mounted to the structural element, and a plurality of bearing elements disposed between the first and second races. The retainer nut is attached to the shaft and includes a cylindrical ring portion and an annular flange disposed on one end of the ring portion. The flange extends radially inward from the ring portion, and a plurality of openings is formed through the flange for allowing metallic chips to freely pass.

18 Claims, 3 Drawing Sheets

RETAINER NUT

STATEMENT REGARDING FEDERALLY SPONSORED RESEARCH & DEVELOPMENT

The U.S. Government may have certain rights in this invention pursuant to contract number F31657-97-C-0016 awarded by the Department of the Air Force.

BACKGROUND OF THE INVENTION

This invention relates generally to gas turbine engines and more particularly to bearings used in such engines.

A turbofan gas turbine engine used for powering an aircraft in flight typically includes, in serial, axial flow relationship, a fan, a low pressure compressor or booster, a high pressure compressor, a combustor, a high pressure turbine, and a low pressure turbine. The combustor generates combustion gases that are channeled in succession to the high pressure turbine where they are expanded to drive the high pressure turbine, and then to the low pressure turbine where they are further expanded to drive the low pressure turbine. The high pressure turbine is drivingly connected to the high pressure compressor via a first rotor shaft, and the low pressure turbine is drivingly connected to both the fan and the booster via a second rotor shaft.

The rotating parts of the engine are supported by a number of bearings that must be suitably lubricated during operation. A typical lubricating system includes an oil tank holding lubricating oil that is pumped to the various bearings for the lubrication thereof. Oil discharged from the bearings is collected in suitable sumps and is commonly referred to as scavenge oil. The scavenge oil is pumped back to the oil tank from where it repeats the lubricating circuit.

The bearings, which are exposed to high temperature, high RPM operation, are subject to failure over time. As a bearing begins to fail, metallic chips break off and are released to the oil sump where they become entrained in the scavenge oil. Accordingly, lubricating systems typically include magnetic chip detectors that detect the increased presence of metallic chips in the scavenge oil, thereby indicating the onset of bearing failure. This allows the bearings to be replaced before complete failure occurs.

One current bearing design includes a bearing race concentrically mounted on the shaft. A retainer nut is threaded onto the end of the shaft for retaining an oil sump seal on the shaft. A separate spacer is located between the retainer nut and the bearing race for facilitating assembly of the bearing. Centrifugal forces cause many of the metallic chips in the scavenge oil to migrate underneath the spacer where they become trapped at the retainer nut. The oil flowing through the sump cannot overcome the viscous and centrifugal forces holding the metallic chips against the metal rotating parts. Thus, the migration of chips from a failing bearing to the magnetic chip detector, which is normally disposed in the scavenge oil pump, upstream of the oil filter, is limited because a large quantity of chips get trapped by the retainer nut and spacer. The reduced amount of chips reaching the magnetic chip detector means that impending bearing failures are not reliably detected.

Accordingly, there is a need for bearing design in which the metallic chips do not become trapped and prevented from reaching the magnetic chip detector.

BRIEF SUMMARY OF THE INVENTION

The above-mentioned need is met by the present invention, which provides a retainer nut for use in a bearing assembly disposed between a shaft and another structural element. The bearing assembly includes a first race mounted to the shaft, a second race mounted to the structural element, and a plurality of bearing elements disposed between the first and second races. The retainer nut is attached to the shaft and includes a cylindrical ring portion and an annular flange disposed on one end of the ring portion. The flange extends radially inward from the ring portion, and a plurality of openings is formed through the flange.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
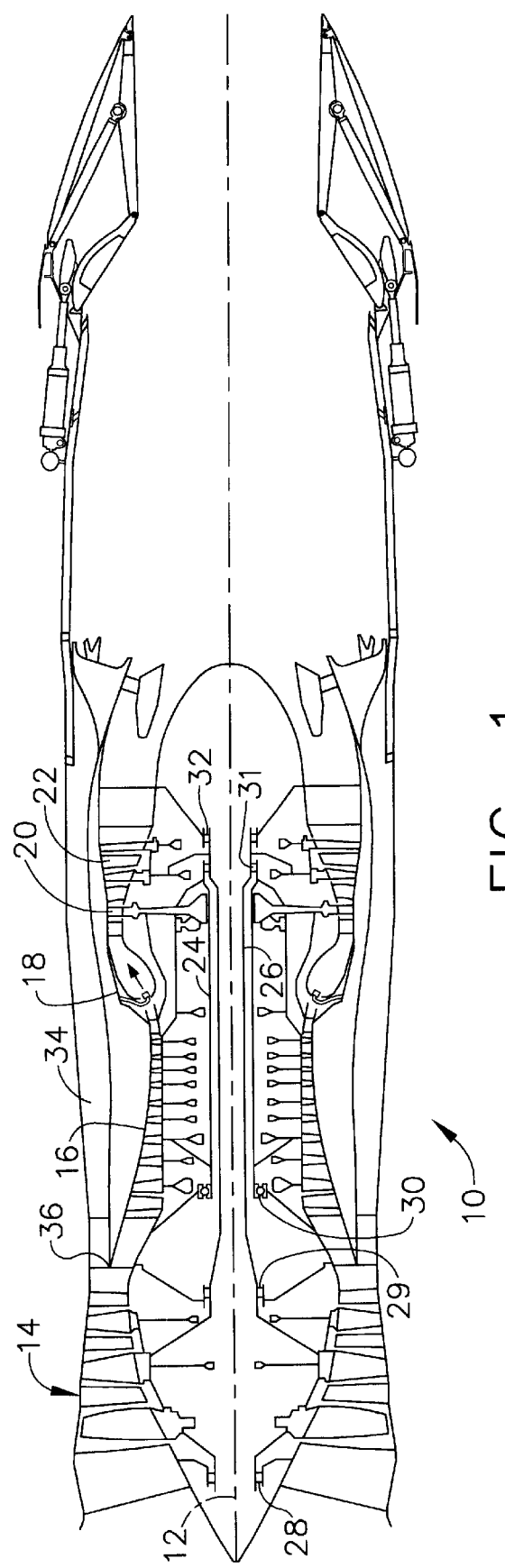
FIG. 1 is schematic cross-sectional view of a gas turbine engine having a retainer nut.

Referring to the drawings wherein identical reference numerals denote the same elements throughout the various views, FIG. 1 schematically shows an exemplary turbofan gas turbine engine 10. While turbofan engines in general are well known in the art, a brief description of the overall configuration of the engine 10 and the interrelationship of its various components will enhance understanding of the invention to be described below. Furthermore, it should be pointed out that a turbofan engine is used only as an example; the present invention is not limited to turbofan engines and can be implemented in a wide variety of engine types as well as other applications.

The engine 10 includes, in serial, axial flow relationship about a longitudinal centerline axis 12, a multi-stage fan section 14, a high pressure compressor 16, a combustor 18, a high pressure turbine (HPT) 20, and a low pressure turbine (LPT) 22. The high pressure compressor 16, combustor 18, high pressure turbine 20, and low pressure turbine 22 are commonly referred to as the engine core. The high pressure turbine 20 is drivingly connected to the high pressure compressor 16 with an HPT shaft 24, and the low pressure turbine 24 is drivingly connected to the fan section 14 with an LPT shaft 26, which is disposed within the HPT shaft 24. The rotating shafts 24, 26 are supported by a number of bearings 28–32 located throughout the engine 10. Many turbofan engines further include a low pressure compressor or booster (not shown) mounted on the LPT shaft 26 in the engine core. In addition, although a multi-stage fan section is depicted in FIG. 1, it should be noted that single stage fan sections are also possible.

During engine operation, ambient air enters the engine inlet and a first portion of the ambient air, typically referred to as the primary gas stream, passes through the fan section 14 and the high pressure compressor 16, being pressurized by each section in succession. The primary gas stream then enters the combustor 18 where the pressurized air is mixed with fuel and burned to provide a high energy stream of hot combustion gases. The high energy gas stream passes through the high pressure turbine 20 where it is expanded to drive the high pressure compressor 16 via the HPT shaft 26. The high energy gas stream is then further expanded in the low pressure turbine 22, with energy being extracted to drive the fan section 14 via the LPT shaft 28. A second portion of the ambient air passing through the fan section 14 (typically referred to as the secondary or bypass airflow) bypasses the engine core and flows through a bypass duct 34, which begins at a splitter 36 located between the fan section 14 and the high pressure compressor 16. The secondary airflow, which is pressurized by the fan section 14, exits the engine 10 and provides a significant portion of the engine thrust.

Figure 2:
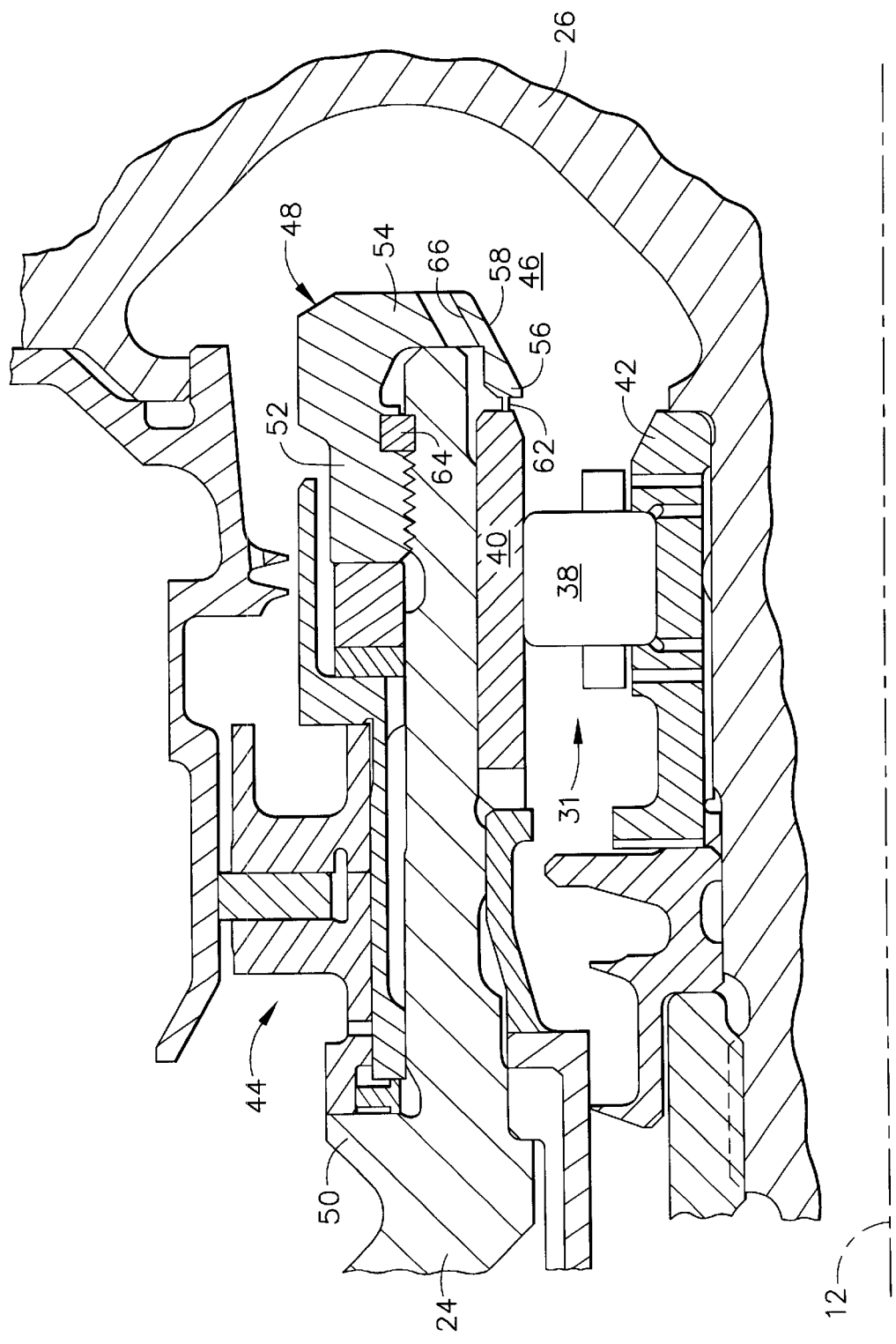
FIG. 2 is a more detailed, fragmentary cross-sectional view of the gas turbine engine of FIG. 1 that shows a bearing and retainer nut.

Turning now to FIG. 2, the fourth bearing 31 is shown in more detail. While only the fourth bearing 31 is described in detail herein, it should be noted that the present invention is not limited to this particular bearing and is applicable to many other bearing designs. The fourth bearing 31 is disposed between the HPT shaft 24 and the LPT shaft 26 and includes a plurality of rollers 38 (only one shown in FIG. 2) retained between an outer race 40 and an inner race 42. Although cylindrical rollers are illustrated herein by way of example, the present invention encompasses other types of bearing elements such as spherical or ball bearings. The outer race 40 is press fit into the inside diameter of the HPT shaft 24, near the aft end thereof. The inner race 42 is mounted on the outside diameter of the LPT shaft 26 and is located axially so as to be suitably aligned with the outer race 40.

A seal assembly 44 is mounted on the outside diameter of the HPT shaft 24 for containing oil in a sump cavity 46. A retainer nut 48 is attached to the aft end of the HPT shaft 24 for retaining the seal assembly 44 thereon. In particular, the retainer nut 48 is attached to the outer surface of the HPT shaft 24 so as to restrain the seal assembly 44 against an axial abutment 50 formed on the HPT shaft 24.

Figure 3:
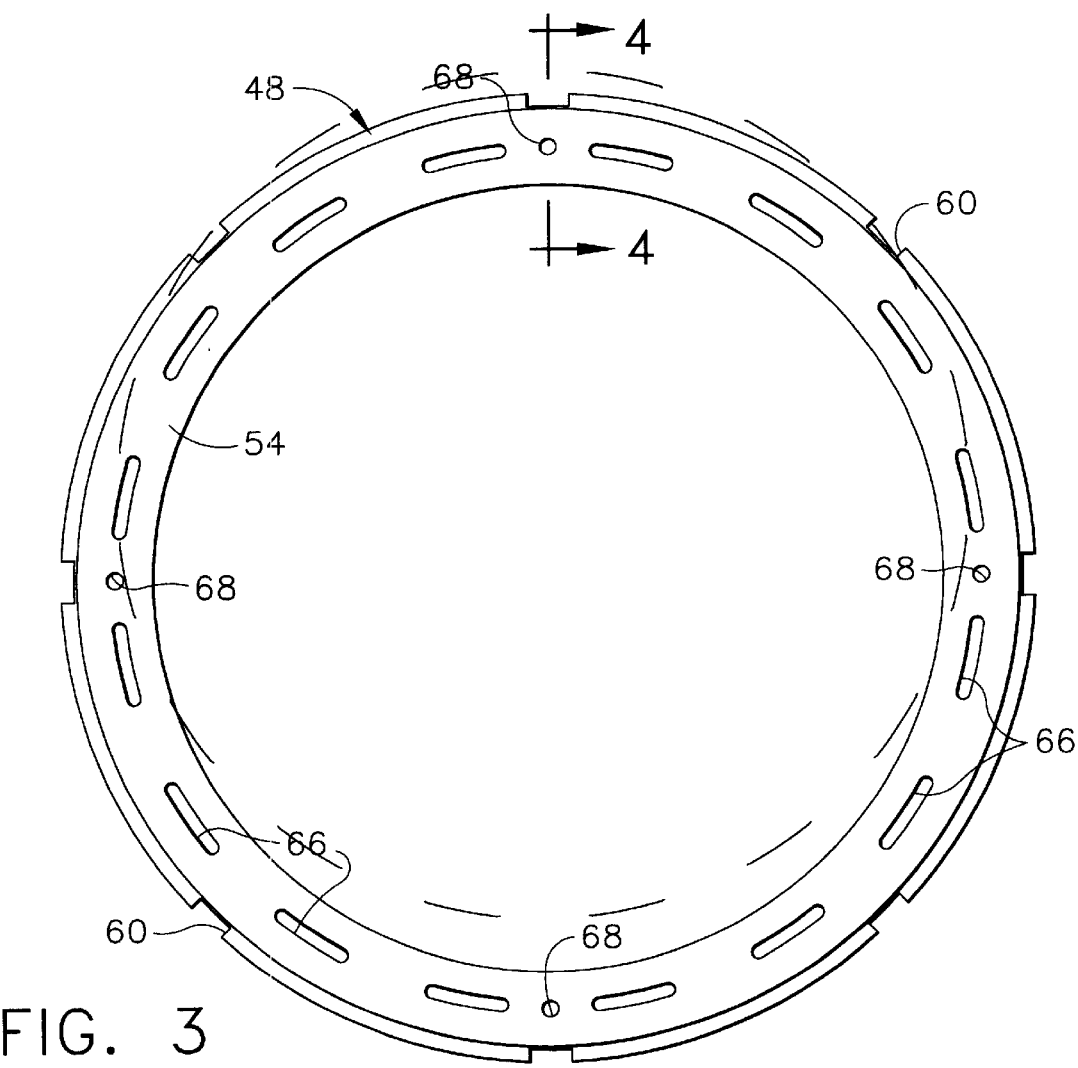
FIG. 3 is an aft-looking-forward end view of the retainer nut of FIG. 2.
Figure 4:
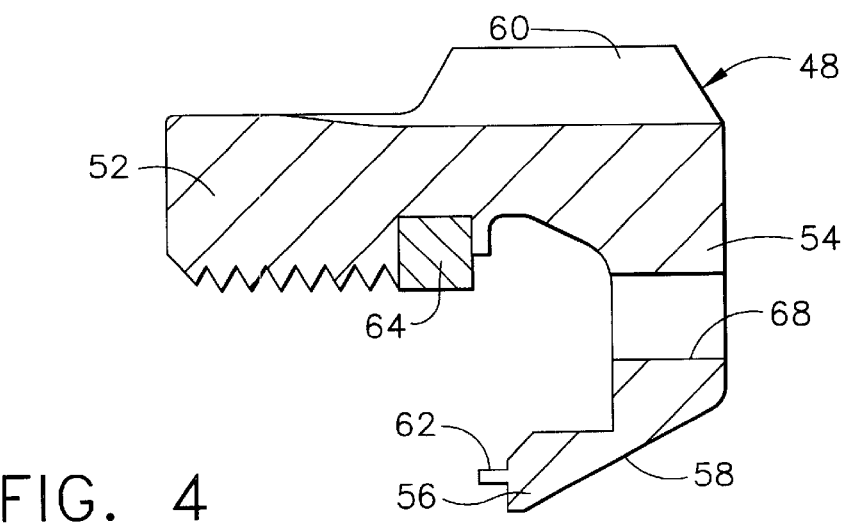
FIG. 4 is a cross-sectional view of the retainer nut taken along line 4—4 of FIG. 3.

Referring now to FIGS. 3 and 4 in addition to FIG. 2, the retainer nut 48 is an integral, substantially annular member having a cylindrical ring portion 52 and an annular flange 54 extending radially inward from the aft end of the ring portion 52. An annular lip 56 is formed on the inner edge of the flange 54. The lip 56 extends forward and radially inward at an angle to define a ramp 58 that facilitates assembly of the bearing 31. In one preferred embodiment, the retainer nut 48 is attached to the HPT shaft 24 by internal threads that are formed on the inner surface of the ring portion 52 and mesh with external threads formed on the outside diameter of the HPT shaft 24. A plurality of notches 60 is provided about the outer surface of the ring portion 52. The notches 60 can be engaged by a wrench or similar tool to facilitate threading the retainer nut 48 onto the HPT shaft 24.

When the retainer nut 48 is fully screwed onto the HPT shaft 24, the forward edge of the ring portion 52 abuts the seal assembly 44 to restrain it against the axial abutment 50 as described above. The flange 54 extends over the aft edge of the HPT shaft 24, and the lip 56 extends into the interior of the HPT shaft 24. The ramp 58 is thus positioned to provide a sloped lead-in for the rollers 38 as the bearing 31 is being assembled. In addition, the forward edge of the lip 56 is spaced from the aft edge of the outer race 40 to define a gap therebetween. A plurality of forward-extending standoffs 62 are located on the forward edge of the lip 56 to ensure that a sufficient gap is maintained between the lip 56 and the outer race 40. A relatively small number, such as four, of the standoffs 62 are equally spaced around the lip 52. A locking insert 64 is received between the ring portion 52 and the HPT shaft 24, adjacent to the threads, to prevent the retainer nut 48 from inadvertently loosening. FIG. 4 shows a chamfer located adjacent to the standoff 62 and alternatively the retainer nut 48 can be constructed without such a chamfer.

The flange 54 has a plurality of openings 66 formed therethrough to allow scavenge oil and metallic chips to be released aft of the retainer nut 48. Each opening 66 has an elongated, arcuate shape in a circumferential direction, and the openings 66 are equally spaced around the flange 54 so as to collectively define a circle centered on the retainer nut 48. FIG. 3 shows 16 openings 66 disposed around the retainer nut 48, but the present invention is not limited to this number of openings. Any number of openings 66 is possible as long as the combined cross-sectional area is sufficient to prevent chips from being trapped forward of the retainer nut 48. For instance, one embodiment having 20 openings has proved to be efficient. As best seen in FIG. 2, the openings 66 are sloped in a radially outward direction as they extend axially, fore-to-aft, through said flange. This slope reduces friction as metallic chips pass through the openings 66 due to centrifugal force. The angle of slope can be about 45 degrees relative to the longitudinal axis of the cylindrical ring portion 52, which coincides with the centerline axis 12, although other angles are possible. Two primary factors for determining an optimum angle of slope are the effectiveness of passing chips and the ease of machining the openings.

The inner surfaces of the openings 66 can also be roughened to further facilitate passage of chips through the openings 66. On a smooth surface, chips will tend to lay flat in the oil film and be held against the surface due to the viscosity of the film. Roughening the surface will increase turbulence in the oil film such that chips will be prevented from adhering to the surfaces. A surface roughness on the order of about 250 microns or greater is generally sufficient for this purpose.

The retainer nut 48 also has a number of depth check holes 68 formed through the flange 54. These holes 68 permit the axial depth of the retainer nut 48 relative to the HPT shaft 24 and/or outer race 40 to be checked so as to verify that the retainer nut 48 has been properly installed. The depth check holes 68 are formed perpendicularly through the flange 54, and a small number of holes 68, such as four, are disposed about the flange 54.

If the bearing 31 starts to fail during operation, metallic chips will be released into the scavenge oil. The chips will be forced radially outward by the large centrifugal forces created by the rotating engine structure. The gap between the lip 56 and the outer race 40 will provide a channel for scavenge oil and chips to freely pass through. From there, the chips will migrate through the openings 66. Accordingly, metallic chips released from the bearing 31 will not be trapped forward of the retainer nut 48 and will ultimately be detected by the magnetic chip detector (not shown) further downstream in the lubrication circuit. It is believed that the standoffs 62, in addition to maintaining the gap between the lip 56 and the outer race 40, provide a deflection mechanism that tends to turn the oil flow in a direction that helps force chips through the openings 66. The geometry of the standoffs 62 can be optimized to facilitate this deflection function. For instance, it is believed that increasing the radial width of the standoffs 62 will assist in directing chips towards the openings 66.

Another benefit of this design is that the openings 66 provide a drain path for oil that would otherwise puddle between the retainer nut 48 and the outer race 40. Without such a drain path, oil could bake or coke upon engine shutdown and create another means for catching chips from a failing bearing.

The foregoing has described a bearing assembly in which metallic chips from a failing bearing are not prevented from reaching the magnetic chip detector. This results in earlier detection of failing bearings and a corresponding increase in flight safety. While specific embodiments of the present invention have been described, it will be apparent to those skilled in the art that various modifications thereto can be made without departing from the spirit and scope of the invention as defined in the appended claims.

What is claimed is:

1. A retainer nut comprising:

a cylindrical ring portion;

an annular flange disposed on one end of said ring portion, said flange extending radially inward from said ring portion, wherein a plurality of openings are formed through said flange; and a lip formed on a radially inner edge of said flange, said lip defining a ramp.

2. The retainer nut of claim 1 wherein said ring portion defines a longitudinal axis and said openings extend axially through said flange at a slope with respect to said longitudinal axis.

3. The retainer nut of claim 1 wherein each opening has an elongated, arcuate shape in a circumferential direction.

4. The retainer nut of claim 1 wherein said openings are equally spaced around said flange.

5. The retainer nut of claim 1 wherein at least one inner surface of each opening is roughened.

6. The retainer nut of claim 1 further comprising a plurality of standoffs formed on said lip.

7. The retainer nut of claim 1 further comprising at least one depth check hole formed through said flange.

8. A bearing assembly disposed between a shaft and another structural element, said bearing assembly comprising:

a first race mounted to said shaft;

a second race mounted to said structural element;

a plurality of bearing elements disposed between said first and second races; and a retainer nut attached to said shaft, said retainer nut comprising a cylindrical ring portion, an annular flange disposed on one end of said ring portion, said flange extending radially inward from said ring portion, wherein a lip is formed on a radially inner edge of said flange, said lip defining a ramp, and a plurality of openings are formed through said flange.

9. The bearing assembly of claim 8 wherein said ring portion defines a longitudinal axis and said openings extend axially through said flange at a slope with respect to said longitudinal axis.

10. The bearing assembly of claim 8 wherein each opening has an elongated, arcuate shape in a circumferential direction.

11. The bearing assembly of claim 8 wherein said openings are equally spaced around said flange.

12. The bearing assembly of claim 8 wherein at least one inner surface of each opening is roughened.

13. The bearing assembly of claim 8 wherein said ring portion is attached to an outer surface of said shaft, said flange extends over an edge of said shaft, and said lip extends into said shaft.

14. The bearing assembly of claim 13 wherein said ring portion is threaded onto said shaft.

15. The bearing assembly of claim 14 further comprising a locking insert disposed between said ring portion and said shaft.

16. The bearing assembly of claim 13 wherein said lip is spaced from said outer race so as to define a gap therebetween.

17. The bearing assembly of claim 16 further comprising a plurality of standoffs formed on said lip and extending toward said outer race.

18. The bearing assembly of claim 8 further comprising at least one depth check hole formed through said flange.

* * * * *